Jan. 8, 1952 — H. RANDICK — 2,581,555
BRAKE MECHANISM FOR CASTING REELS
Filed Feb. 1, 1950 — 2 SHEETS—SHEET 1

Inventor
Herman Randick
By Clarence A. O'Brien and Harvey B. Jacobson
Attorneys

Jan. 8, 1952 — H. RANDICK — 2,581,555
BRAKE MECHANISM FOR CASTING REELS
Filed Feb. 1, 1950 — 2 SHEETS—SHEET 2

Inventor
Herman Randick

By Clarence A. O'Brien
and Harvey B. Jacobson
Attorneys

Patented Jan. 8, 1952

2,581,555

UNITED STATES PATENT OFFICE 2,581,555

BRAKE MECHANISM FOR CASTING REELS

Herman Randick, Chicago, Ill.

Application February 1, 1950, Serial No. 141,774

5 Claims. (Cl. 242—84.5)

My invention relates to improvements in fishing line reels of the casting type, and specifically to brake mechanism therefor.

In some present-day casting reels having so-called anti-backlash brakes, the brake is set when the spool is at rest with braking pressure such that the reel is too sluggish for long casts. For long casts, the braking pressure must be manually released gradually for each cast, but, if released too much, the spool will overrun the line in the middle of the cast, with the result that backlash may occur in the middle of the cast, usually with the line tangled, and the cast will be ruined. To obviate such occurrences, experts control the speed of the spool with the thumb, but that is tiresome and difficult, particularly when the hands are cold. Also, in such reels the brake retards operation of the spool in retrieving the line, which renders retrieving harder.

With the foregoing in mind, the primary object of my invention is to provide for such reels automatic brake mechanism of the drag pin type controlled conjointly by centrifugal throw thereof and relative rotation of the reel spool and spool operating shaft in a manner to overcome the objections set forth in the foregoing as pertaining to some present day casting reels.

Another object is to provide brake mechanism for the purpose set forth which is simple in construction, inexpensive to manufacture, and not liable to get out of order and spoil the cast.

Other and subordinate objects, within the purview of my invention, together with the precise nature of my improvements, will be readily understood when the succeeding description and claims are read with reference to the drawings accompanying and forming a part of this specification.

Figure 1:
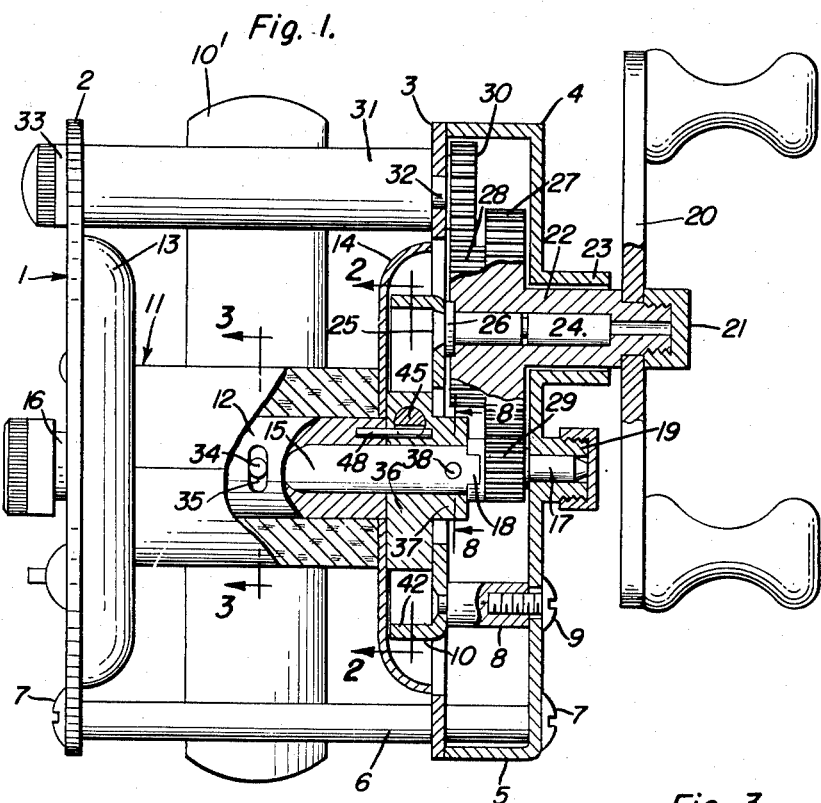
Figure 1 is a view in plan partly in section of a casting reel embodying my improved brake mechanism.

Referring to the drawings by numerals, my invention has been illustrated therein as embodied in a casting reel comprising a frame 1 which includes a pair of side disk plates 2, 3, respectively, a cap member 4 with an annular rim flange 5 fitted against the plate 3 coaxially therewith, cross rods one of which is shown at 6, with end screws 7 connecting said plates 2, 3 and cap member 4, lateral studs, one of which is shown at 8 secured to the cap member 4 by screws, as at 9, and carrying an annular brake drum 10, and the usual curved base plate 10' for attachment in the conventional manner to a fishing rod, not shown.

The spool 11 for winding up the line, not shown, comprises a cork-covered hollow hub shaft 12 carrying bell-shaped end flanges 13, 14 rotatably fitting between the side plates 2, 3. The hub shaft 12 is rotatably mounted on a driven spool operating shaft 15 suitably journaled at one end, in a manner not shown, in an axial bearing 16 on the side plate 2 with its other end extending through the flange 14 and having a reduced terminal 17, in the cap member 4, journaled in a capped bearing 19 on the cap member 4.

The spool operating shaft 15 is driven by operation of the usual handle 20 clamped by a cap nut 21 on the outer end of a gear hub 22 extending out of a lateral sleeve 23 on the member 4 and journaled on a lateral spindle 24 attached to the brake drum 10 by a screw 25 with a thrust collar 26 on said spindle clamped against said drum 10.

Relatively large and small gears 27, 28 running in the cap member 4 are formed coaxially on the hub 22, the larger gear 27 meshing with a relatively smaller gear 29 keyed on the spool operating shaft 15 as at 18. The gear 28 meshes with a smaller gear 30 in the cap member 4 fast on the conventional level winding spindle 31 extending between the side plates 2, 3 with a reduced end 32 journaled in the side plate 3 and its other end suitably journaled, in a manner not shown, in a bearing 33 on the side plate 2.

A delayed action pickup connection is provided between the hub shaft 12 and the spool operating shaft 15 comprising a pickup pin 34 fixed in said spool operating shaft 15 diametrically thereof with its ends extending into a pair of diametrically opposite short slots 35 extending circumferentially in the hub shaft 12.

A T-shaped brake pin carrier 36 with a hub 37 is fixed on the spool operating shaft 15 to rotate therewith in the flange 14 and by means of a pin 38 extending through said hub 37 and the spool operating shaft 15. The brake pin carrier 36 is positioned in the brake drum 10. The brake pin carrier 36 comprises a head barrel 40 transverse to the spool operating shaft 15 with a longitudinal bore 41 therein, said barrel and bore being tangential to the working face 42 of the brake drum 10. The brake pin carrier 36 is formed of aluminum to reduce its weight for a purpose presently seen.

A brake pin 43 endwise slidable in the bore 41 is backed by a coil spring 44 in said bore and urged into engagement with the working face 42 of said drum tangentially thereof. The brake pin 43 comprises an inner section 45 of steel to give it weight, for a purpose presently clear, and an outer end raw-hide section 46 threaded into said section 45. The stem 47 of the brake pin carrier 36 is proportioned to counterbalance the head barrel 40.

An eccentric brake operating crank pin 48, for operating the brake pin 43, extends outwardly of the end of the hub shaft 12 contiguous the brake drum 10 into a notch 49 in the inner section 45 of the brake pin 43. An arcuate slot 50 in the brake pin carrier 36 concentric to the spool operating shaft 15 and into which the crank pin 48 extends provides for revolving movement of said crank pin 43 relative to said carrier 36 and correspondingly rotary movement of the spool 11 relative to said carrier.

Figure 2:
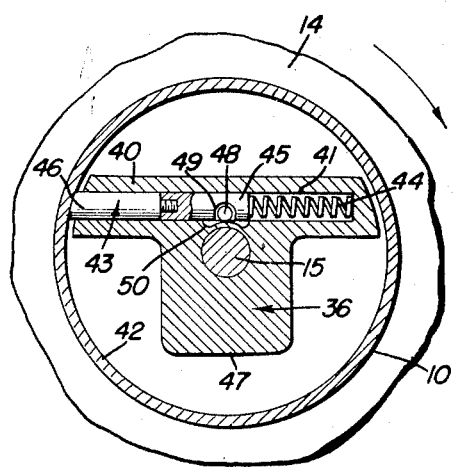
Figure 2 is a fragmentary view in transverse section taken on the line 2—2 of Figure 1 and illustrating the brake engaged.
Figure 3:
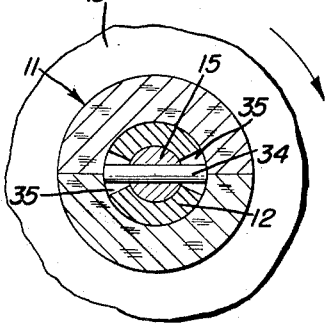
Figure 3 is a view in transverse section taken on the line 3—3 of Figure 1 illustrating the position of the delayed action pickup connection between the spool and the spool operating shaft when the spool is at rest.
Figure 4:
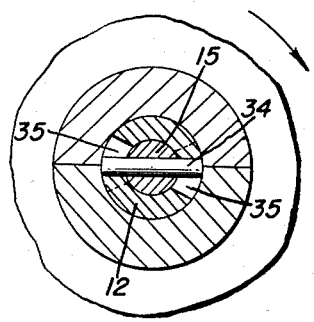
Figure 4 is a similar view illustrating the position of the delayed action pickup connection when the spool picks up the spool operating shaft in rotation of the spool in a casting operation.

Referring to the operation of my invention, when the spool 11 is at rest, the brake pin 43 under the pressure of the coil spring 44 engages the brake drum 10 and the crank pin 48 is centered in the slot 50, as shown in Figure 2, and the pickup pin 34 is centered in the slots 35, as shown in broken lines in Figure 4. However, the coil spring 44 is very light and the tension exerted thereby against the brake pin 48 is not sufficient to effect any material braking force other than enough to lightly hold the spool 11 at rest after its momentum is spent. Now, with the spool 11 held against rotation by the thumb preparatory to casting and released at the instant the cast is made, the spool 11 will, under pull of the line and plug, not shown, be rotated free on the spool operating shaft 15 in the direction indicated by the arrows in Figures 2, 3 and 4 until the pickup pin 34 engages relatively opposite ends of the slots 35 as shown in Figure 4 at which point it will pick up said shaft 15 and start the same in motion, together with the gears 29, 28, 27, 30 and the handle 20.

Figure 5:
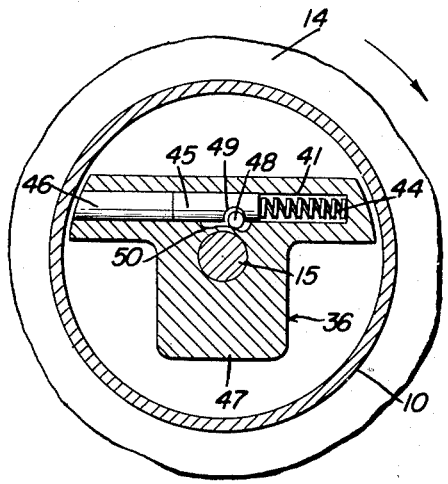
Figure 5 is a view similar to Figure 2 showing how the brake pin is disengaged from the brake drum when the spool in initial forward rotation thereof overruns the spool operating shaft; and also when the spool operating shaft is rotated free of the spool in retrieving.
Figure 6:
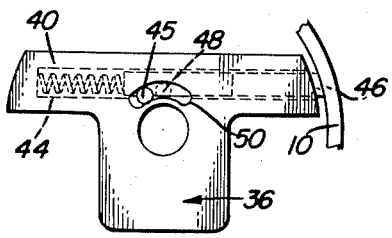
Figure 6 is a view in side elevation partly in section of the brake pin carrier illustrating the brake pin disengaged in full lines and engaged in dotted lines.
Figure 7:
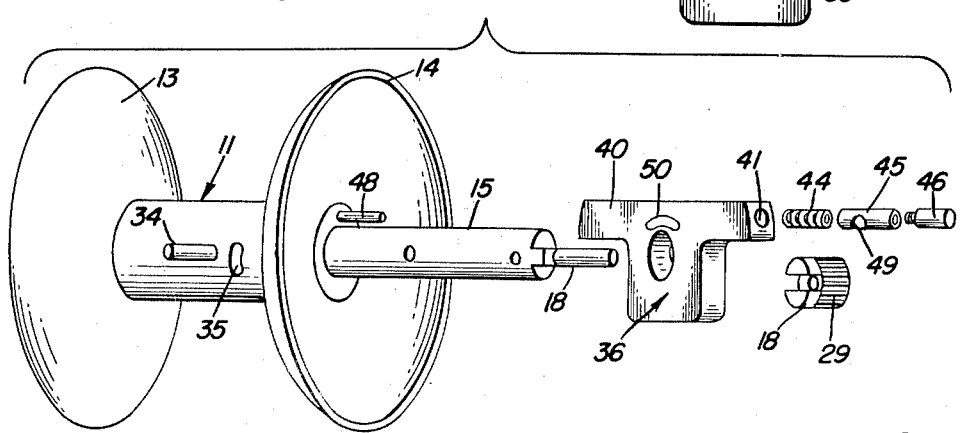
Figure 7 is an exploded view of the spool, the pickup pin, spool operating shaft, brake pin carrier, brake pin and backing spring, and the gear keyed to the gear driven shaft.
Figure 8:
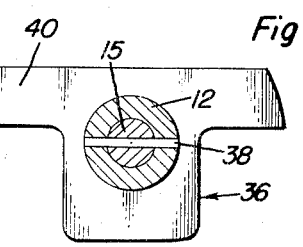
Figure 8 is a detail view in vertical transverse section taken on the line 8—8 of Figure 1.

As soon as this free rotation of the spool 11 begins, the crank pin 48 will be revolved in the slot 50 in the direction of rotation of the spool 11 and thereby draw the brake pin 43 inwardly of the barrel 40 into brake-releasing position as shown in Figure 5 and in dotted lines in Figure 6. The spool 11, spool operating shaft 15, gears 29, 28, 27, 30 and handle 20 will now tend to overrun the line in substantially the middle of the cast due to greater momentum thereof than of the line and plug, especially a very light plug. As soon as this occurs, the spool 11 is relieved of pull of the line and plug, and the spool will slow down relative to the spool operating shaft to permit the brake pin 43 to be thrown by centrifugal force against the brake drum 10 to drag the spool 11.

The degree of drag or braking pressure exerted by the brake pin 43 under the action of centrifugal force is predetermined in my improved reel to keep the spool 11 overrunning the line slightly so that there is no drag on the line at any time during the cast regardless of different speeds of rotation of the spool. This is accomplished in constructing the reel by establishing a normal longitudinal position of the inner section 45 relative to and crosswise of its axis of revolution so as to obtain a proper minimum braking pressure resulting from centrifugal throw of said pin 43 with a given weight of the inner section 45. Of course, such braking pressure will increase with increase in speed of rotation of the spool 11 and proportionately. Obviously, when a cast is completed and the plug hits water, the spool will stop when its momentum is spent.

In retrieving, the spool, operating shaft 15 will be rotated counter-clockwise, as shown in Figures 2, 3 and 5, freely relative to the spool 11 until the pickup pin 34 engages the ends of the slots 35 opposite to those first-mentioned, and thus pick up the spool to wind up the line. As soon as this free rotation of said shaft 15 starts, the crank pin 48 will be revolved to retract the brake pin 43 in the barrel 40 and release the brake so that the spool is free of drag during retrieving.

Obviously, although control of the spool 11 by my improved brake mechanism is completely automatic, the spool 11 may still be controlled by the thumb for short casts if that be desired.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. In a casting reel for a fishing line, a spool for forward rotation under pull of the line in casting and reverse rotation to retrieve the line, a spool reversing shaft extending therethrough and rotatable forwardly and reversely, a delayed action pickup connection between said spool and shaft providing for free overrruning rotation of said spool on said shaft to pick up and rotate said shaft forwardly during casting, a normally engaged brake for said spool, means operative by forward free rotation of said spool on said shaft to release said brake, said brake engaging under the action of centrifugal force if the speed of forward rotation of said spool when the line slackens becomes slower than that of said shaft under momentum thereof, and manual means for rotating said shaft reversely to reverse said spool and retrieve said line, said pickup connection comprising a diametrical pin extending through said shaft, and diametrically opposite circumferential slots in said spool into which said pin extends.

2. In a casting reel for a fishing line, a spool for forward rotation under pull of the line in casting and reverse rotation to retrieve the line, a spool reversing shaft extending therethrough and rotatable forwardly and reversely, a delayed action pickup connection between said spool and shaft providing for free overrunning rotation of said spool on said shaft to pick up and rotate said shaft forwardly during casting, a normally engaged brake for said spool, means operative by forward free rotation of said spool on said shaft to release said brake, said brake engaging under the action of centrifugal force if the speed of forward rotation of said spool when the line slackens becomes slower than that of said shaft under momentum thereof, said brake comprising a brake drum mounted in fixed position relative to said shaft, a brake pin carrier fast on said shaft for rotation therewith, and a brake pin slidable in said carrier toward and from said drum into brake engaging and releasing positions, respectively, and manual means for rotating said shaft reversely to reverse said spool and retrieve said line.

3. In a casting reel for a fishing line, a spool for forward rotation under pull of the line in casting and reverse rotation to retrieve the line, a spool reversing shaft extending therethrough and rotatable forwardly and reversely, a delayed action pickup connection between said spool and shaft providing for forward free rotation of said spool on said shaft to pick up and rotate said shaft forwardly during casting, a normally engaged brake for said spool, means operative by forward free rotation of said spool on said shaft to release said brake, said brake engaging under the action of centrifugal force if the speed of forward rotation of said spool when the line slackens becomes slower than that of said shaft under momentum thereof, said brake including a brake pin carrier fast on said shaft for rotation therewith, a brake pin slidable in said carrier into brake-engaging and releasing positions, respectively, and manual means for rotating said shaft reversely to reverse said spool and retrieve said line.

4. In a casting reel for a fishing line, a spool for forward rotation under pull of the line in casting and reverse rotation to retrieve the line, a spool reversing shaft extending therethrough and rotatable forwardly and reversely, a delayed action pickup connection between said spool and shaft providing for forward free rotation of said spool on said shaft to pick up and rotate said shaft forwardly during casting, a normally engaged brake for said spool, means operative by forward free rotation of said spool on said shaft to release said brake, said brake engaging under the action of centrifugal force if the speed of forward rotation of said spool when the line slackens becomes slower than that of said shaft under momentum thereof, said brake including a brake pin carrier fast on said shaft for rotation therewith, a brake pin slidable in said carrier into brake-engaging and releasing positions, respectively, said means first mentioned comprising a crank pin on said spool rotatably connected to said brake pin, and manual means for rotating said shaft reversely to reverse said spool and retrieve said line.

5. In a fishing reel, a spool for winding up and unwinding a line, a spool operating shaft extending through the spool, a delayed action pickup connection between said spool and shaft providing for limited relative rotation of the spool and shaft, a brake drum circumscribing said shaft, a brake pin carrier fast on the shaft for rotation therewith, a spring-pressed brake pin in the carrier normally engaging said drum and slidable in the carrier to disengage the drum, and means for sliding said pin upon relative rotation of said spool and shaft.

HERMAN RANDICK.

REFERENCES CITED

The following references are of record in the file of this patent:

UNITED STATES PATENTS

| Number | Name | Date |
|---|---|---|
| 1,456,283 | Schmid | May 2, 1923 |